W. G. STROZIER.
MACHINE FOR CUTTING DOVETAIL GROOVES.
APPLICATION FILED APR. 23, 1913.

1,085,390.  Patented Jan. 27, 1914.

Witnesses  Webster G. Strozier
  Inventor,
by C. A. Snow & Co.
  Attorneys.

UNITED STATES PATENT OFFICE.

WEBSTER G. STROZIER, OF WASHINGTON, DISTRICT OF COLUMBIA, ASSIGNOR OF ONE-HALF TO CHARLES C. SINCLAIR, OF WASHINGTON, DISTRICT OF COLUMBIA.

MACHINE FOR CUTTING DOVETAIL GROOVES.

1,085,390.    Specification of Letters Patent.    Patented Jan. 27, 1914.

Application filed April 23, 1913. Serial No. 763,136.

*To all whom it may concern:*

Be it known that I, WEBSTER G. STROZIER, a citizen of the United States, residing at Washington, in the District of Columbia, have invented a new and useful Machine for Cutting Dovetail Grooves, of which the following is a specification.

This invention relates to machines for cutting dovetail grooves which are designed especially to receive dovetails such as produced by a machine disclosed in Patent No. 1,070,635, issued to me on August 19, 1913.

One of the objects of the present invention is to provide a machine having a plurality of cutting units all of which include cutters receiving motion from a common drive element, the units being adjustable relative to each other so that the grooves produced by the machine can be located at any desired distances apart.

A further object is to provide means whereby any one or more of the units can be shifted out of active position relative to the drive element.

A further object is to provide a machine of this character which is simple in construction, the parts of which can be readily repaired and replaced, and which will not easily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
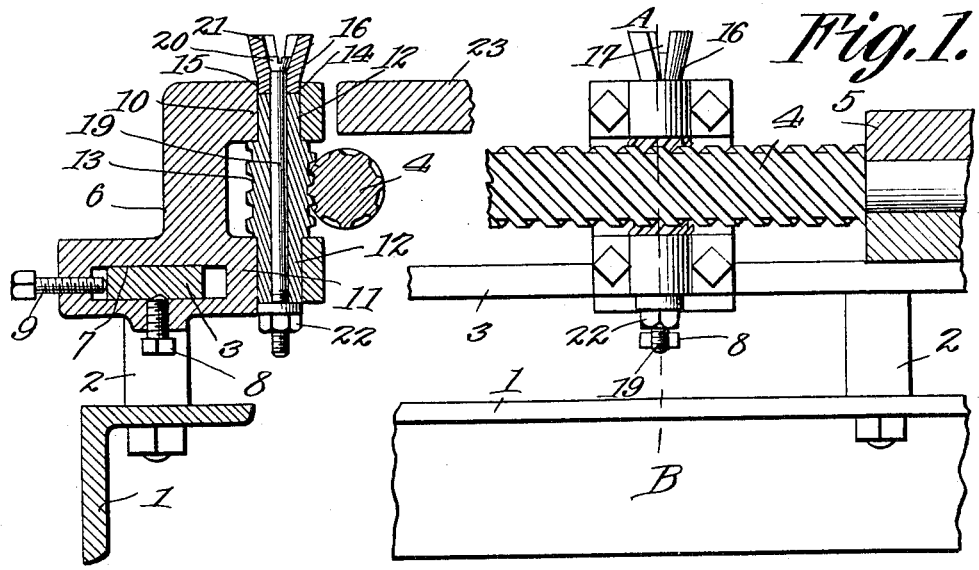
Figure 3:
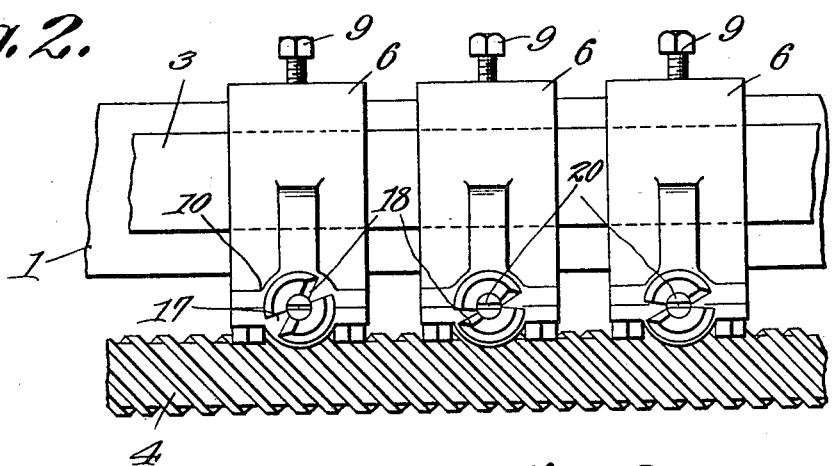
Figure 4:
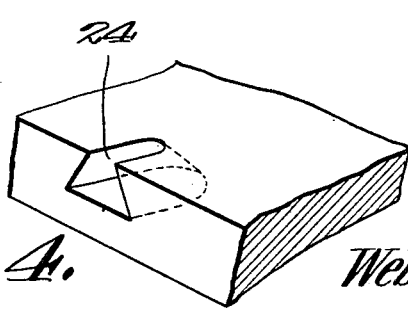

In said drawings:—Figure 1 is a front elevation of one of the elements and a portion of its drive element, adjacent parts of the machine being shown. Fig. 2 is a section on line A—B Fig. 1. Fig. 3 is a plan view of the structure, three cutting units being illustrated. Fig. 4 is a perspective view of a portion of a stair tread having in one end thereof a dovetail groove such as produced by the present machine.

Referring to the figures by characters of reference, 1 designates a portion of the frame of the machine on which are arranged suitable supports 2 carrying a guide bar 3. A worm shaft 4 is mounted for rotation adjacent and parallel with the bar 3, any suitable bearings being provided therefor, one of these bearings being illustrated at 5. This shaft can be driven in any suitable manner and at any speed desired.

Adjustably mounted on the bar 3 are any desired number of units. Each unit includes a block 6 having an angular opening 7 through which the guide bar 3 extends, there being a set screw 8 extending into the bottom portion of the unit and adapted to engage bar 3 so as to hold the unit against movement relative to the bar. Another screw 9 extends into the end of the unit and is adapted to bear against one side of the bar 3 for the purpose of shifting the unit transversely of the bar 3 in one direction.

The block 6 has forwardly extending upper and lower ears 10 and 11 in which are journaled the cylindrical ends or terminals 12 of a worm gear 13, the threads on the gear being located below the ears 10 and 11. The upper terminal 12 of the worm gear is located below the upper face of the unit 10 so that a recess 14 is thus formed. This recess is adapted to receive the cylindrical lower end 15 of the cutter. The active portion of the cutter is frusto-conical, as shown at 16 and is formed with V-shaped slots 17 extending throughout the length of the active portion of the cutter, the front or advancing edges of the cutter formed along these openings being sharpened, as shown at 18 in Fig. 3.

A clamping bolt 19 extends through the center of the gear 13 at its ends, this bolt being formed with a conical head 20 adapted to fit within a conical recess 21 formed in the center of the cutter 16, the slots 17 opening into this center recess. Bolt 19 extends downwardly below the gear 13 and is engaged by a nut 22 which, when tightened, serves to draw the bolt 19 downwardly, thus not only binding the cylindrical extension 15 of the cutter 16 against the upper end of the extension 12 of gear 13, but also serving to bind the conical head 20 upon the wall of the recess 21. Thus the cutter is held securely upon the upper end of the gear and is compelled to rotate with the gear.

By loosening the set screw 8, and unscrewing the screw 9, the unit 6 can be shifted rearwardly away from the drive shaft 4 and then be shifted longitudinally until the unit is brought to any desired position upon the bar 3. After the bar has thus been moved, the unit can be shifted forwardly so as to thus bring its worm gear 13 into mesh with the worm shaft 4. Set screw 8 is then tightened and the unit held in active relation with the drive shaft.

A table 23 is supported above the drive shaft 4 and by placing stock thereon it can be fed accurately against the cutters 16. As these cutters rotate, the advancing edges 18 thereof will cut away the material in the paths thereof and the cutters will thus enter the stock and form a dovetail groove such as shown at 24 in Fig. 4.

The machine herein described is especially designed for producing dovetail grooves in the ends of stair treads so that dovetails formed upon banisters can be inserted into engagement with the treads. Obviously by mounting the units adjustably in the manner shown, dovetail grooves can be located any desired distance apart. Should it be desired to render one or more of the units inactive, the screws 8 of said units are loosened and the screws 9 are turned against the bar 3 so as thus to shift the units rearwardly thereby to disengage the gears 13 of said units from the drive shafts 4.

What is claimed is:—

1. The combination with a frame, supports thereon, and a horizontal guide bar connecting the supports, of a worm shaft above and parallel with the guide bar, a work supporting table extending over said shaft, a block slidably mounted on the guide bar and having its upper end flush with and close to the top of the work supporting table, means carried by the block for engaging the guide bar to hold the block against movement, means carried by the block and coöperating with the guide bar for adjusting the block from the table, a worm gear journaled within the block for rotation about a vertical axis, said gear meshing with the worm shaft, and an upwardly extending cutter carried by the gear for engaging work fed thereto horizontally from the table.

2. A machine of the class described including a frame, supports thereon, a horizontal guide bar carried by the supports, a table above and at one side of the guide bar, a plurality of units adjustably mounted on the bar and at one side of the table, said units having their upper ends flush with the upper surface of the table and normally extending close to the table, each unit including a block having an opening through which the guide bar extends, upper and lower ears extending from the block and toward the table, a worm gear having cylindrical terminals journaled in the ears and adapted to rotate about a vertical axis, a cutter revoluble with the gear and extending above the block for engagement by work moved horizontally from the table, means carried by the block for engaging the guide bar to hold the block against sliding movement, a worm shaft parallel with the guide bar and normally engaged by the worm gears of the several units, and means carried by each block and coöperating with the guide bar for disengaging the worm gear of said unit from the worm shaft.

In testimony that I claim the foregoing as my own, I have hereto affixed my signature in the presence of two witnesses.

WEBSTER G. STROZIER.

Witnesses:
SELINA WILLSON,
CHAS. C. SINCLAIR.

---

Copies of this patent may be obtained for five cents each, by addressing the "Commissioner of Patents, Washington, D. C."